United States Patent [19]

Beasley

[11] 4,296,362
[45] Oct. 20, 1981

[54] MOTOR HAVING ELECTRONICALLY SWITCHED STATOR FIELD CURRENT AND INTEGRAL TORQUE CONTROL

[75] Inventor: Denny D. Beasley, Cincinnati, Ohio

[73] Assignee: Beasley Electric Corporation, Georgetown, Ohio

[21] Appl. No.: 907,120

[22] Filed: May 18, 1978

[51] Int. Cl.³ .............................................. H02P 6/02
[52] U.S. Cl. .................................... 318/138; 318/254; 318/439
[58] Field of Search ............... 318/138, 244, 254, 700, 318/704, 703, 720–724, 718, 747, 748, 778, 781, 480, 313, 640, 439

[56] References Cited

U.S. PATENT DOCUMENTS

| | | | |
|---|---|---|---|
| 3,204,165 | 8/1965 | Kreutzer | 318/138 |
| 3,214,663 | 10/1965 | Kreutzer | 318/138 |
| 3,250,971 | 5/1966 | Brunner | 318/138 |
| 3,299,336 | 1/1967 | Johannes | 318/138 |
| 3,321,685 | 5/1967 | Johannes | 318/138 |
| 3,333,171 | 7/1967 | Platnick | 318/138 |
| 3,585,474 | 6/1971 | Kobayashi | 318/138 |
| 3,696,278 | 10/1972 | Kuniyoshi et al. | 318/778 |
| 3,793,573 | 2/1974 | Tsuboi | 318/722 |
| 3,832,614 | 8/1974 | Olliffe | 318/313 |
| 3,940,669 | 2/1976 | Tsuboi et al. | 318/721 |
| 4,005,347 | 1/1977 | Erdman | 318/138 |
| 4,015,178 | 3/1977 | Phillot et al. | 318/778 |
| 4,027,213 | 5/1977 | de Valroger | 318/723 |
| 4,097,788 | 6/1978 | Nygaard et al. | 318/138 |
| 4,125,796 | 11/1978 | Nagase et al. | 318/721 |
| 4,134,055 | 1/1979 | Akamatso | 318/722 |
| 4,135,120 | 1/1979 | Hoshimi et al. | 318/721 |
| 4,197,489 | 4/1980 | Dunn et al. | 318/313 |

Primary Examiner—J. V. Truhe
Assistant Examiner—John W. Redman
Attorney, Agent, or Firm—Frost & Jacobs

[57] ABSTRACT

An electric motor having a construction to insure full utilization of driving currents containing significant harmonic energy. The stator field current may be provided from a multi-phase source or switched electronically through optical sensing of rotor position to eliminate mechanical commutation. Motor torque is made variable by controlling the duration of field current pulses supplied to the stator winding, which also permits variable regenerative dynamic braking of the motor.

12 Claims, 9 Drawing Figures

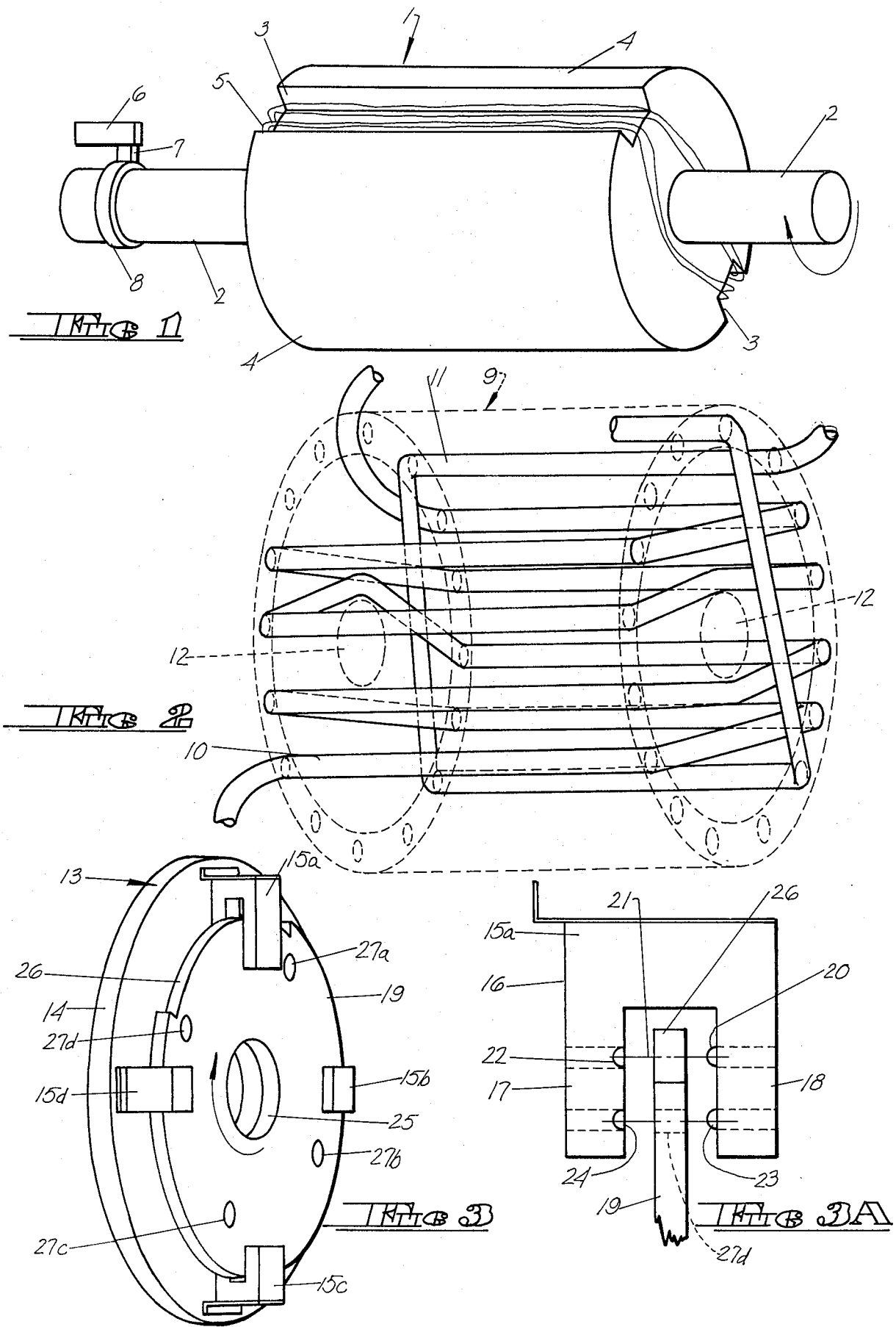

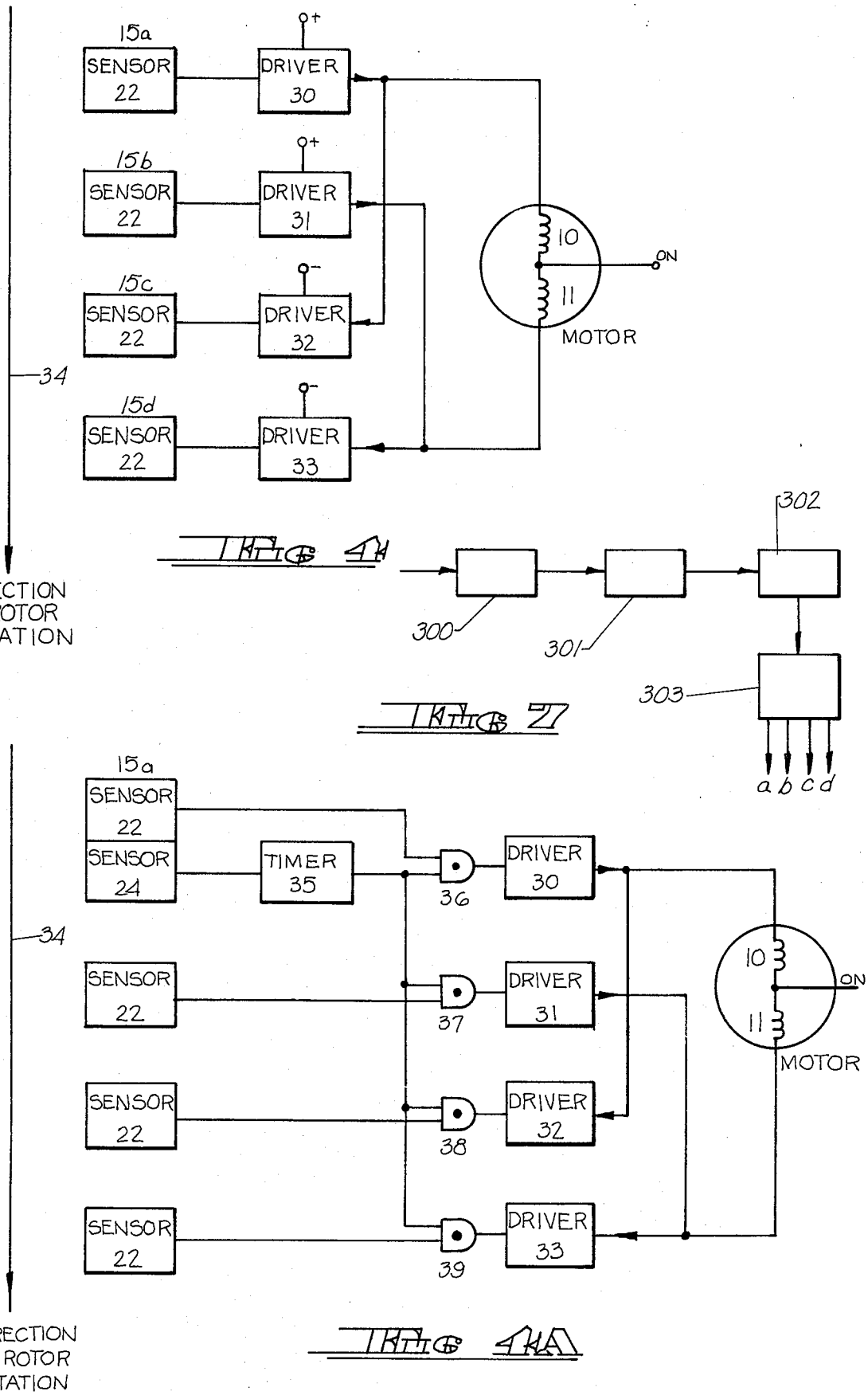

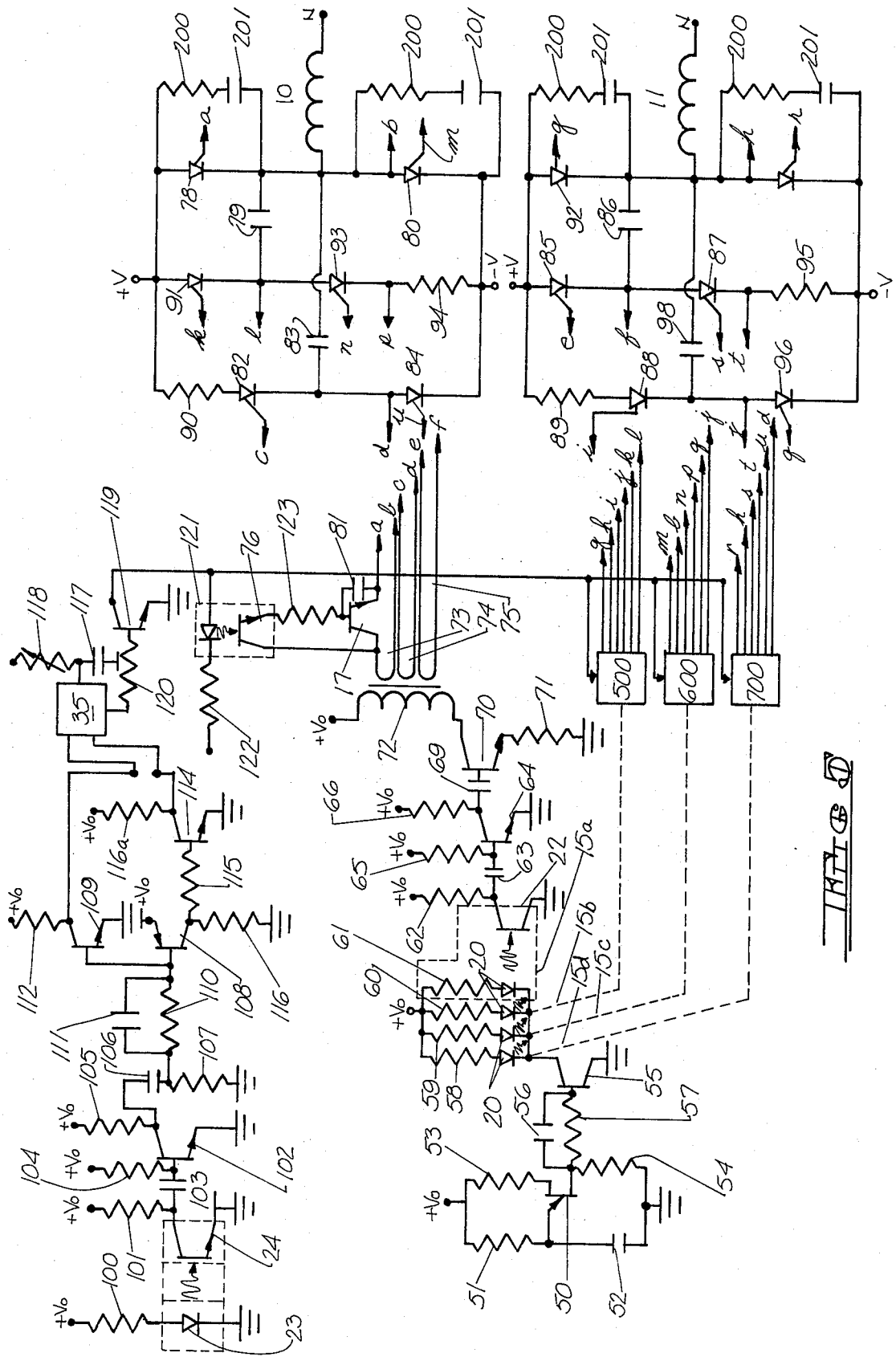

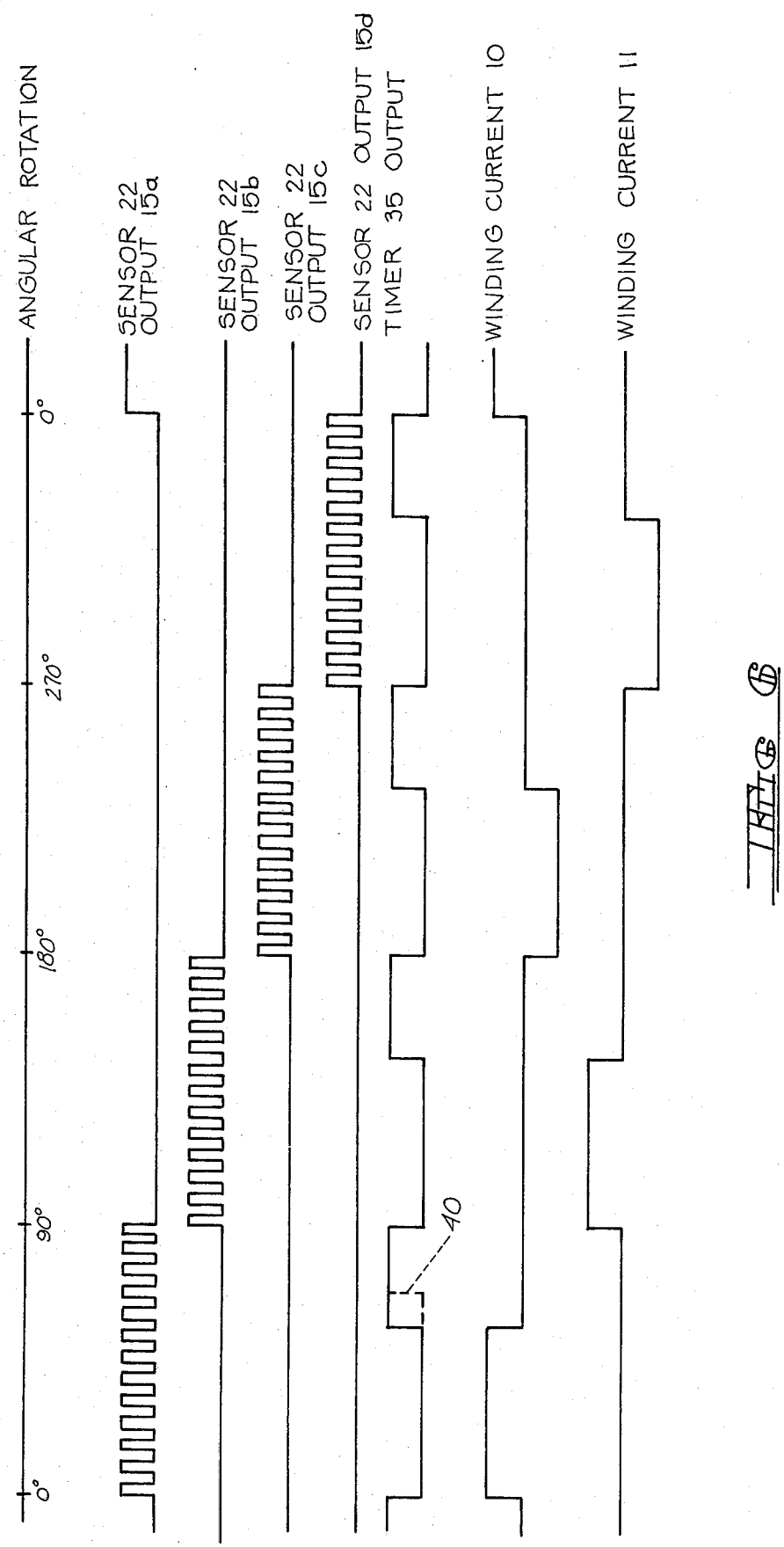

MOTOR HAVING ELECTRONICALLY SWITCHED STATOR FIELD CURRENT AND INTEGRAL TORQUE CONTROL

BACKGROUND OF THE INVENTION

1. Field of the Invention

The present invention is directed generally to electric motors and more particularly to an electric motor providing full utilization of haromonic energy as well as electronically switched stator field current and integral torque control.

2. Description of the Prior Art

It is well known that conventional electric motors are not designed to respond efficiently to nonsinusoidal driving currents. In the usual case, a synchronous motor driven by a sinusoidal power source will run at a fixed speed corresponding to the line frequency and motor configuration. However, if a nonsinusoidal driving current containing harmonic is used energy is lost without resulting in useful work output at the rotor shaft. In some cases nonsinusoidal driving currents can cause excessive motor vibration or even a reduction in useful output torque. In addition, the unutilized harmonic energy may also appear as heat within the motor which can lead to shortened life and increased maintenance costs. Such problems have often confronted designs of electronically switched motor currents which often must employ nonsidusoidal switching currents.

In addition, schemes for improving the efficiency of or reducing the materials utilized in AC or DC motors are well known and numerous. In recent years, attention has been particicluarly directed to eliminating the need to mechanically commutate or switch large field currents in such motors. Mechanical commutation has generally brought with it mechanical wear and increased noise and electrical interference caused by electrical transients produced during the switching process. In addition, mechanical commutators and their associated support assemblies add substantial weight and rotating mass to the motor, as well as create the need for interpoles and the like to correct inefficient field patterns.

Prior art workers have suggested various types of electronic switching techniques to replace the mechanical commutation, and have in some case relied upon optical sensing of rotor position to fix the field current switch points. However, most of these approaches fail to fully utilize the applied energy as described hereinabove, resulting in inefficient operation and unnecessarily complex and rugged construction.

Furthermore, existing electronic motor control systems have not provided a satisfactory means for effectively controlling stator field current to modify the torque characteristics of the motor. This deficiency has led to the existence of a large number of custom designed motors adapted to a particular application, rather than a motor of universal application with variable torque characteristics which can be easily and inexpensively adapted to a particular working environment.

SUMMARY OF THE INVENTION

The motor of the present invention seeks to overcome the deficiencies of the prior art motors by providing full utilization of harmonic energy as well as a stator field current which is switched electronically through noncontact switching means, or by external means, to eliminate mechanical commutation entirely. The elimination of mechanical commutators, as well as the accompanying support assemblies and interpoles for correcting inefficient field paterns, results in a substantial reduction in cost and weight when compared to conventional motor designs. Furthermore, motor torque is made variable by controlling the duration of field current pulses supplied to the stator winding in order to produce an inexpensive motor of universal application. This arrangement permits variable regenerative braking of the motor without the need for mechanical brakes, etc. Furthermore, a damping network in association with the stator windings stores energy thereby permitting more efficient operation and eliminating phase correction as in prior art designs. The circuits employed to carry out these functions can be integrated with the motor structure to produce a unitary design. In addition, these unique characteristics, together with additional features of the motor which will become apparent from the detailed description which follows, find particular application in high speed or high power motors, especially those used in electric automobiles and the like.

In a preferred embodiment, the mechanical configuration of the motor comprises a rotor having a pole face substantially twice as wide as a single stator winding. A pair of narrow diametrically opposed grooves or slots are inscribed longitudinally in the rotor to accept a single rotor winding. A nominal amount of unidirectional current is supplied to the rotor winding to establish a rotor field by means of a single slip ring assembly associated with the rotor shaft. Since the rotor field is substantially constant, no commutation of rotor current is necessary.

The motor stator comprises a substantially cylindrical cage adapted to accept the rotor, and supports a pair of multiple turn stator windings arranged at right angles to each other. Each stator winding may form a continuous current path or be arranged in series-parallel arrangement to limit inductance as is well understood in the art. A source of switched bidirectional current is supplied independently to each stator winding to establish a rotating stator field. The current may be supplied from external alternating supplies or by means of a switched power supply responsive to rotor position as described hereinafter. In either event, each stator winding will experience a positive current flow for less than 90° of rotor travel, followed by no current flow for at least 90° of rotor travel, followed by a negative current flow for less than 90° of rotor rotation to complete the sequence. The duration of each current pulse supplied to a particular stator winding is electronically controlled to vary the torque characteristics of the motor. Since substantially rectangular current pulses are applied to the motor windings, full energy transference is obtained as will be seen hereinafter.

To accurately determine rotor position to initiate stator current flow, sensing means are provided in association with the rotor shaft to produce a signal output for every 90° of rotor rotation. In a preferred embodiment, each sensor comprises an optical source closely associated with an optical receiver. A slotted disc nonrotatably secured to the rotor shaft is positioned so as to cause periodic interruption of the light passing between the optical source and receiver. The slotted disc is so oriented that an electrical output is produced from the optical sensor during the time that each rotor pole is within a stator field.

When a particular optical sensor begins to produce an output, current of the proper polarity is switched electronically to one or the other of the stator windings. At the same instant, current is inhibited from flowing in the other stator winding. When the rotor has rotated through an angle of 90°, a subsequent optical sensor will be activated to produce current flow of the proper polarity in the de-energized winding, while at the same time inhibiting current flow in the winding which was energized. A particular winding will thus see a positive current flow for less than 90° of rotor rotation, followed by no current for a period of time associated with more than 90° rotor rotation, followed by a negative current flow for less than 90° of rotor rotation, terminating in no current flow for more than 90° of rotor rotation to complete the sequence.

In addition, a separate sensor, which may also be of the optical type, is provided in association with the slotted disc to provide an electrical output for every 90° of rotor rotation. This output is used in conjunction with circuitry to be described to determine the duration of each current pulse supplied to the stator windings. Thus current may be supplied to the stator windings for any period of time less than 90° of rotor rotation. This pulse arrangement is manually variable to provide control of the motor torque characteristics to tailor the motor to a particular application. By reversing the supply polarity and control operations, this variable torque control feature can be utilized to provide variable regenerative braking of the motor, which can find particular application in connection with electrically driven vehicles to provide motive and braking functions in a single motor design.

Finally, a damping network in association with the stator windings, stores energy between switching cycles thereby improving the efficiency of the motor and eliminating additional windings or circuitry found in prior art designs to correct phase imbalance, etc.

BRIEF DESCRIPTION OF THE DRAWINGS

FIG. 1 is a fragmentary perspective view of a typical rotor construction of the motor of the present invention.

FIG. 2 is a fragmentary perspective view of a typical stator construction of the present invention.

FIG. 3 is a perspective view of the slotted disc and optical sensing construction of the motor of the present invention.

FIG. 3A is a fragmentary enlarged side elevation view of optical interruptor 15a of FIG. 3.

FIG. 4 is a block diagram illustrating the sensing and current switching technique used in the motor of the present invention.

FIG. 4A is a block diagram including torque control of the current switching system of the motor of the present invention.

FIG. 5 is a schematic diagram of the stator field current switching and torque control circuitry of the present invention.

FIG. 6 is a timing diagram illustrating the switching sequence of the motor of the present invention.

FIG. 7 is a block diagram of a synchronous triggering circuit.

DESCRIPTION OF THE PREFERRED EMBODIMENTS

The present invention comprises an electric motor having a rotor supported within a wound stator which permits full utilization of driving currents having significant harmonic energy. The stator field current may be switched electronically through optical sensing of rotor position, or by external means, to eliminate mechanical commutation. In addition, motor torque is made variable by controlling the duration of field current pulses supplied to the stator winding. In a preferred embodiment, each rotor pole face subtends an angle substantially twice that subtended by a stator winding.

FIG. 1 illustrates a typical construction for the rotor of the motor of the present invention. The rotor, shown generally at 1, which may be laminated as required, is nonrotatably supported by a cylindrical shaft 2 coaxial with the longitudinal axis of the rotor. The ends of shaft 2 may be rotatably supported by bearings or the like, as is well understood in the art. Relatively narrow diametrically opposed slots or grooves 3 are inscribed longitudinally along the surface of the rotor 1. It is preferred that slots 3 be as narrow as possible, in order to provide the greatest possible pole face areas 4 positioned between slots 3. In general, each rotor pole face 4 will subtend an angular distance substantially twice the angular distance subtended by a stator winding.

A single multiple turn rotor winding 5 is positioned in slots 3 as shown in FIG. 1 to provide the required rotor flux. Nominal current may be supplied to rotor winding 5 by means of a non-cummutating slip ring assembly 6 or the like associated with rotor shaft 2. As is well understood, slip ring assembly 6 comprises stationary conducting brush 7 which slidably communicates with conductive ring 8 nonrotably secured to rotor shaft 2. Hence, current flow may be provided through brush 7 and conductive ring 8 to rotor winding 5. It will be observed that the current supplied to rotor winding 5 is unidirectional, thereby producing a substantially constant rotor flux pattern.

A typical stator construction, shown generally at 9, is illustrated in FIG. 2. Stator 9 comprises a substantially cylindrical cage-like structure supporting a pair of multiple turn windings 10 and 11 arranged at right angles to each other. Each winding may be formed of a continuous conductor, or may be connected in a series-parallel arrangement as is well understood in the art to limit inductance and to facilitate a motor having a more rapid response.

Rotor 1 is rotatably received within the stator cage, the ends of shafts 2 being rotatably supported by means of bearings or the like (not shown) in the ends 12 of stator 9.

In one mode of operation, DC current is supplied to rotor windings 5 through slip ring assembly 6 to produce a rotor field. For example, if a positive current is applied to winding 10, a field will be produced within stator 9 so as to cause rotor 1 to rotate. This positive current to winding 10 is maintained until rotor 1 has rotated through 90°, whereupon a positive current is supplied to stator winding 11 to maintain the rotating stator field. When rotor 1 has rotated through an additional 90°, which places it at a position 180° removed from its initial position, the positive current to stator winding 11 is switched off, and a negative current is supplied to stator winding 10, which produces a stator field of reverse polarity to interact with the now reversed rotor field and maintain rotor rotation. Finally, the negative current to stator winding 10 is switched off and a negative current is supplied to stator winding 11 to complete the stator field commutation. In this arrangement where the stator is excited by an external two phase power source, the rotor will rotate synchronously at the excitation frequency of the supply. It will further be observed that the direction of rotation may be reversed by merely reversing the direction of DC current flow through the rotor winding.

It is preferred that each pole face 4 of rotor 1 will subtend an angle substantially twice the angle subtended by a stator winding 10 or 11. For example, in the preferred embodiment described, each stator winding 10 or 11 subtends an angle of 90°, while each rotor pole face 4 subtends on angle of nearly 180°, ignoring the small pole face are required by slot 3. It is believed that this unique construction produces a nearly constant magnetic flux distribution, permitting nearly all of the electrical energy supplied to be utilized, even if the delivered current contains a significant amount of harmonic energy, such as might occur for square wave type excitation currents. This eliminates inefficient use of electrical energy, motor vibration, heating, loss of torque, and other problems associated with prior act designs which have heretofore been incapable of converting harmonic energy to useful torque output. The novel construction of the present motor thus allows the use of square wave stator drive currents such as might be produced by electronic switching techniques, or by the external multiphase supply described hereinbefore.

In certain situations a two phase supply may not be available. Under this condition, means are provided to electronically switch stator field current in response to the actual rotor position. Means for sensing the rotor positions indicated generally at 13, are illustrated in FIG. 3. Sensing means 13 comprises a flat circular stationary mounting plate 14 which may be secured to the stator frame or located externally to the motor. Stationary plate 14 mounts four optical interrupter position sensors 15a–15d spaced at 90° intervals around the inside periphery of plate 14. Each optical interrupter comprises a substantially U-shaped mounting bracket 16, as shown in FIG. 3A in connection with optical interrupter 15a. The depending arms 17 and 18 of bracket 16 are spaced apart a sufficient amount to easily clear slotted disc 19 inserted therebetween. Each optical interrupter 15a–15d contains an optical source 20, such as an IR emitter, mounted in arm 18 so as to shine across the space between arms 17 and 18. Positioned in optical path 21 emitted by optical source 20, and mounted in arm 17, is an optical receiver 22, such as an IR sensitive diode, which emits an electrical output when illuminated by optical source 20. It will be understood that optical interrupters 15b–15d are constructed similarly to optical interrupter 15a in this regard.

Optical interrupter 15a alone contains an additional optical source 23 and optical receiver 24 positioned below optical source 20 and optical receiver 21, respectively, which sense the position of the rotor to provide torque control, as will be explained in more detail hereinafter.

As is best shown in FIG. 3, slotted disc 19 comprises a flat circular plate non-rotatably secured to rotor shaft 2 by means of central aperture 25 which fits snugly over the outer surface of rotor shaft 2, such that disc 19 rotates with the rotor. Disc 19 contains an arcuate slot 26 extending approximately 90° circumferentially along the outside edge of the disc, which operates in association with optical source 20 and optical receiver 21 of the optical interrupters to sense rotor position. Disc 19 also contains four circular apertures 27a–27d spaced at 90° intervals and at equal distances from the center disc 19. These apertures operate in conjunction with optical source 23 and optical receiver 24 of optical interrupter 15a to provide rotor position information for controlling the torque of the rotor.

Aperture 27a is aligned approximately with the trailing edge of slot 26, while aperture 27d is aligned approximately with the leading edge of slot 26. In operation, an electrical output will be produced for optical receiver 24 when the optical output from optical source 23 is permitted to pass through one of the apertures 27a–27d. This will occur for each 90° of rotor rotation.

FIG. 4 illustrates in block diagram form the operation of the optical interrupters in establishing coordinated pulse stator currents. As illustrated, the output of sensor 22 associated with optical interrupter 15a activates current driver 30 which supplies a positive current output to motor winding 10. Similarly, sensor 22 associated with optical interrupter 15b activates driver 31 which supplied a positive current output to stator winding 11. Sensor 22 associated with optical interrupter 15c energizes driver 32 which provides a negative current output to stator winding 10, while sensor 22 associated with optical interrupter 15d provides a negative current output to stator winding 11. One terminal of motor windings 10 and 11 is connected to the neutral associated with the negative and positive sources of power supplying drivers 30–33.

In operation, for the direction of rotor rotation shown by arrow 34 in FIG. 4, let it be assumed that the rotor initially starts in such a position that sensor 22 associated with optical interrupter 15a produces an output. This causes a positive current to be supplied to stator winding 10 from driver 30 to drive rotor 1 in the direction shown in FIG. 1. Positive current will continue to be supplied from driver 30 to winding 10 until slot 26 from disc 19 passes from optical interrupter 15a to optical interrupter 15b. During this period of time, sensor 22 associated with optical interrupter 15b will cause driver 31 to produce a positive current to stator winding 11, maintaining rotation of rotor 1 in the direction shown. As the rotor continues to change angular position, the electrical output from interrupter 15c will cause driver 32 to produce a negative current flow in stator winding 10. Since under this condition the rotor will be mechanically rotated 180° from its original position, a torque will continue to be produced to insure rotation in the direction shown. Finally, as slot 26 moves from interrupter 15c to interrupter 15d, driver 33 will produce a negative current flow in stator winding 11 to complete the commutation sequence. Thereafter, the sequence continues as long as the motor is running.

The torque characteristics of the motor may be modified by varying the duty cycle of the current pulses supplied to windings 10 and 11 drivers 30–33. A scheme for accomplishing this is illustrated diagrammatically in FIG. 4A. As in the embodiment of FIG. 4, the sensors 22 associated with optical interrupters 15a–15d produce electrical outputs during the angular rotation defined by slot 26. In addition, sensor 24 associated with interrupter 15a will produce a pulse of short duration for each 90° of rotor rotation as described hereinabove. The output of sensor 24 activates a timer, which may be a monostable multivibrator or the like, which produces an output pulse of manually variable width. The output of timer 35 is combined with the outputs from sensor 22 in AND gates 36–39 to activate current timers 30–33 as described hereinabove. Thus, current will be supplied to windings 10 and 11 for a period less than the full 90° of rotation of rotor 1, as shown in the timing diagram of FIG. 6. It will be observed that the duration of the output pulses of timer 35 may be varied, as at 40, to change the duty cycle of the current pulses supplied to the stator windings, thereby modifying the motor torque characteristics. It will further be observed that the maximum rotor speed is limited by the duration of the pulses from timer 35.

A typical circuit used to implement the electronic switching and torque control described hereinabove is illustrated in FIG. 5. A split DC power supply producing voltages +V and −V is used to supply the rotor and stator currents for the motor. In addition, voltage $V_O$ may be derived from the +V supply by conventional means to provide a source of power for the electronic circuits to be described.

A conventional unijunction transistor relaxation oscillator is formed by unijunction transistor 50 having its emitter connected to the junction of a resistor 51 and a capacitor 52 which determine the frequency of oscillation of the oscillator. The remaining end of capacitor 52 is connected to ground, while the other end of resistor 15 is connected to $V_O$. The base 1 junction of transistor 50 is connected to $V_O$ through a resistor 53, while the base 2 junction of transistor 50 is connected to ground through resistor 54 and to the base of a transistor 55 through the parallel combination of capacitor 56 and resistor 57. The emitter of transistor 55 is tied to ground while the collector is connected to the cathodes of optical sources 22 of optical interrupters 15a–15d. The anodes of sources 20 are connected through resistors 58–61 to $V_O$, so that sources 20 will emit optical pulses of short duration at a frequency established by the relaxation oscillator.

Each optical source 20 is optically coupled to an optical receiver 22 such as that shown in FIG. 5 in connection with optical interrupter 15a, as described hereinabove. The emitter of optical receiver 22 is connected to ground, while the collector is connected to $V_O$ through a resistor 62, and through capacitor 63 to the base of transistor 64 which operates to increase the rise time of the pulse as well as filter low level noise signals. The emitter of transistor 64 is connected to ground, while the base and collector are connected to $V_O$ through a resistor 62, and through capacitor 63 to the base of transistor 64 which operates to increase the rise time of the pulse as well as filter low level noise signals. The emitter of transistor 64 is connected to ground, while the base and collector are connected to $V_O$ through resistors 65 and 66, respectively. The collector of transistor 64 is coupled through differentiating capacitor 69 to the base of transistor 70. The emitter of transistor 70 is connected to ground through resistor 71, while the collector is connected to $V_O$ through the primary winding of pulse transformer 72. The pulses produced by the relaxation oscillator and appearing at the primary of transformer 72 when the optical receiver is exposed to optical pulses from optical source 20 by slot 26 thus operate to produce a dynamic signal to insure self-starting of the motor.

The pulse transformer utilizes a trio of secondary windings 73, 74 and 75 to trigger silicon controlled rectifiers for supplying current to windings 10 and 11 of the motor. It will be understood that optical sources 20 associated with interrupters 15b–15d have associated therewith similar receiving and pulse forming circuits depicted by blocks 500, 600 and 700. The output of these blocks are connected to the circuit nodes illustrated in FIG. 5, as will be described in more detail hereinafter.

One terminal of secondary winding 73 is connected to the collectors of light responsive transistor 76 and amplifying transistor 77, while the other terminal is connected to winding 10, the cathode of main SCR 78, commutating capacitor 79 and the anode of main SCR 80. The emitter of amplifying transistor 77 is connected to capacitor 81 and the gate of main SCR 78.

In a similar manner, one terminal of secondary winding 74 is connected to the gate of charge SCR 82, while the other terminal is connected to the junction of commutating capacitor 83, the cathode of charge SCR 82, and the anode of commutating capacitor 84.

One terminal of secondary winding 75 is connected to the gate of commutating capacitor 85, while the other terminal is connected to the junction formed by commutating capacitor 86, the cathode of commutating SCR 85 and the anode of charge SCR 87. The remaining interconnection for blocks 500, 600 and 700 designated d-u are as illustrated.

As shown, the anode of charge SCRs 82 and 88 are connected through current limiting resistors 89 and 90, respectively, to the positive supply +V. Similarly, the anodes of commutating SCRs 85 and 91, and the anodes of main SCRs 78 and 92 are also connected to +V. The cathode of commutating SCR 91 is connected to the remaining terminals of commutating capacitor 79 and the anode of charge SCR 93. The cathodes of charge SCRs 93 and 87 are connected through current limiting resistors 94 and 95, respectively, to the negative supply −V. Similarly, the cathode of commutating SCR 84 and 96 and the cathodes of main SCRs 80 and 97 are connected to −V. The cathode of commutating capacitor 85 is connected to the remaining terminal of commutating capacitor 86 and the anode of charge SCR 87. The remaining terminals of windings 10 and 11 are connected to the neutral of the motor supplies +V and −V.

As described hereinabove, main SCRs 78 and 92 supply positive current to windings 10 and 11 respectively, while main SCRs 80 and 97 supply negative current to the same windings. In operation, let it be assumed that slot 26 of disc 19 is passing through optical interrupter 15d, such that negative current is being supplied to winding 11 through main SCR 97. When slot 46 exposes optical source 20 associated with optical interrupter 15a, pulses will be produced in the secondary windings 73, 74, and 75 of the pulse transformer. Assuming that transistor 77 is conducting, as will be described hereinafter, main SCR 78 will be triggered into conduction, thereby supplying positive current to winding 10. At the same time, charge SCR 82 and commutating SCR 85 will be triggered into conduction. Charge SCR 82 will permit current to flow from the positive supply to charge capacitor 83, while commutating capacitor 85 will rapidly discharge commutating capacitor 86 to provide a pulse at the anode of main SCR 97 to turn main SCR 97 off, thus inhibiting negative current flow through winding 11. This condition will continue until slot 46 exposes the optical source 20 associated with optical interrupter 15b, whereupon pulses will be produced at the pulse transformer outputs associated with block 500 to cause a similar sequence to occur in winding 11. During this period of time, main SCR 92 will be triggered into conduction to provide positive current flow in winding 11, while charge SCR 88 will conduct to charge commutating capacitor 98 and commutating SCR 91 will conduct to discharge commutating capacitor 79 and turn main SCR 70 off, thereby inhibiting positive current flow through winding 10.

This condition will continue to exist until slot 26 becomes aligned with optical source 20 associated with optical interrupter 15c. At this point, pulses will be produced at the pulse transformer outputs associated with block 600 so that main SCR 80 will conduct the supply negative current through winding 10, charge SCR 93 will conduct to begin charging commutating capacitor 79 to a negative value, and commutating SCR 96 will conduct to rapidly discharge commutating capacitor 98 to turn off main SCR 92 and thereby inhibit positive current flow through winding 11. Likewise, when slot 26 reaches optical interrupter 15d, the initial conditions will prevail and the sequence will be repeated.

It will be observed that pulses will be produced at the appropriate pulse transformer output even when the rotor 1 is at rest, as a result of the oscillatory drive pulses supplied by the unijunction transistor relaxation oscillator to optical sources 20. This insures that even in a rest condition a pulse will be produced to turn on the appropriate main SCR to supply stator current and start the motor.

A series combination of a resistor 200 and a capacitor 201 is connected in parallel with each main SCR 78, 80, 92 and 97. These components make up a damping network or tuned circuit which tends to retain energy stored in the field of the associated stator winding, thereby increasing motor efficiency. This technique eliminates field correction by phase advance or other more complex and costly techniques utilized in prior art designs. In addition, the damping network of the present invention increases dv/dt to assist the switching characteristics of the associated SCR.

In general, the motor may be operated by the associated switching circuits as described hereintofor. In addition, the motor may be operated in an asynchronous mode where the positive and negative supplies associated with the commutation circuits are replaced by alternating current power sources. In this method of operation, only main SCRs 78, 80, 92 and 97, together with their associated damping networks, would be utilized. Although the main SCRs are still triggered by the electronic switching circuitry described in relation to the rotor position, the alternating current from the alternating current power sources will consist of half-wave rectified pulses, which will cause the motor to run asynchronously as determined by the electronic switching circuit, rather than by the frequency of the alternating current supply.

The motor of the present invention may also be caused to operate synchronously by replacing the sensing circuit of FIG. 4 with the sensing and commutation circuit of FIG. 7. In this arrangement, an alternating voltage from the alternating current power source is applied to full wave rectifier 300. The full wave rectified pulses from full wave rectifier 300 are applied through a conventional wave shaping circuit 301 to binary counter 302. The output of binary counter 302 is applied to a conventional decoding circuit 303, which may be a two line to four line decoder or the like, such that a pulse will appear first on output line a of decoder 303, followed by a pulse on output line b, followed by an output pulse on line g, followed by an output pulse on h, followed by an output pulse on line a, etc. The outputs of decoder 303 are applied to the corresponding gates of main SCRs 78, 80, 92 and 97, respectively. Thus, main SCR 78 will be triggered into conduction, followed by main SCR 80 being triggered into conduction, and so forth, to produce switched currents in stator windings 10 and 11, and consequently a rotating stator field, thereby causing rotation of the motor rotor.

It will be observed that inasmuch as the rotor has no preferred direction of rotation utilizing the above described scheme, it may be desirable to initially start the motor in the asynchronous mode described hereinbefore, switching subsequently to the synchronous mode of operation.

The remaining part of the circuit of FIG. 5 is concerned with supplying torque control to the motor by providing a means for varying the duty cycle of the current pulses supplied to windings 10 and 11.

As described hereinabove, optical source 23 is positioned beneath optical source 20 of optical interrupter 15a, and provides a constant optical output by current supplied from source $V_O$ through current limiting resistor 100. While optical source 23 and optical receiver 24 have been described as physically associated with optical interrupter 15a, it will be understood that they may be associated with any of the motor interrupters 15b–15d to produce a similar result.

Optical source 23 is optically coupled through apertures 27a–27d to optical receiver 24 positioned beneath optical receiver 21 of optical interrupter 15a. The emitter of optical receiver 24 is connected to ground while the collector is connected to $+V_O$ through resistor 101, and to the base of transistor 102 through capacitor 103. The base of transistor 103 is also connected to $V_O$ through a resistor 104, while the emitter is connected to ground. The collector of transistor 102 is connected to $V_O$ through a resistor 105 and to ground through a differentiation network formed by capacitor 106 and resistor 107. The junction of these elements is connected to the bases of a complementary transistor pair 108 and 109 through the parallel combination of a resistor 110 and a capacitor 111.

The emitter of transistor 109 is connected to ground, while the collector is connected to $V_O$ through a current limiting resistor 112 and to the reset R input of timer or monostable multivibrator 35. The emitter of transistor 108 is connected to $V_O$, while the collector is connected to ground through resistor 113 and to the base of amplifying transistor 114 through a current limiting resistor 115. The emitter of amplifying transistor 114 is connected to ground, while the collector is connected to $V_O$ through resistor 116 and to the trigger input T of monostable multivibrator 35.

The timing period of timer 35 is determined by the combination of capacitor 117 and variable resistor 118. Resistor 118 thus permits the timing period of monostable multivibrator 35 to be varied to vary the torque characteristics of the motor, as will be described hereinafter.

The output of monostable 35 is connected to inverter transistor 119 through a resistor 120. The output of the inverter is connected to anode of light emitting element 121, and to the anode of similar light emitting elements in blocks 500, 600 and 700. The cathodes of the light emitting elements are connected to $V_O$ through a current limiting resistor such as 122.

Optical element 121 is optically coupled to optical receiver 76, the emitter of which is connected through a resistor 123 to the base of transistor 77 and the remaining terminal of capacitor 81. Capacitor 81 eliminates coupling through transistor 76 as a result of the fast rise times involved. It will be understood that transistor 77 operates as a logical AND function, permitting a pulse to be supplied to main SCR 78 only when a pulse output is present at the pulse transformer output and monostrable multivibrator 35 is within its timing cycle.

In operation, an output is produced from optical receiver 24, each time an aperture 27a–27d passes between optical source 23 and receiver 24. The pulses of short duration are differentiated by differentiating elements 106 and 107. The positive pulse produced by the leading edge of the optical receiver 24 output pulse produces a positive going signal on the reset terminal of monostable multivibrator 35 through transistor 109. In a similar manner, the negative going pulse produced by the trailing edge of the receiver 24 output appears as a positive going signal on the trigger input of monostable multivibrator 35 to commence the timing period. This period is determined by the setting of variable resistor 118, and may be varied to correspond to an angular rotation of rotor 1 of 0°–90°. The positive going output pulse of monostable multivibrator 35 is inverted by transistor 119 to cause light emitting element 121 to conduct thereby turning on optical receiver 76 and transistor 77, or a corresponding transistor in blocks 500, 600 and 700 for the appropriate stator winding. Thus full torque will be available to the motor when the duration of monostable multivibrator 35 output pulse corresponds to 90° of rotor rotation, and will be minimized when the pulse width is minimum. It will be observed that monostable 35 is reset by the pulse from transistor 109 at the beginning of each sequence. The duty cycle of the current pulses supplied to the stator winding thus is made variable, so that the torque can be controlled as desired.

It will be observed that the direction of rotation of the rotor may be reversed by merely reversing the sequence of firing of SCRs 78, 80, 82, 84, 85, 87, 88, 91, 92, 93, 96 and 97. This advances their firing by 180°. In addition, if the direction of the rotor field current and the stator supply polarities, the motor can be operated in a variable regenerative braking mode.

It will be understood that various changes in details, materials, steps and arrangements of parts, which have herein been described and illustrated in order to explain the nature of the invention, may be made by those skilled in the art within the principle and scope of the invention as expressed in the appended claims. For example, while for purposes of an exemplary showing the present invention has been described in association with a motor having a single rotor winding and a pair of stator windings, it will be understood that the inventive principle may be applied to any number of rotor and stator windings, provided that each rotor pole face subtends an angle approximately twice that subtended by a stator winding.

The embodiments in which an exclusive privilege or property is claimed are as follows:

1. An electric motor comprising a stator, a rotor rotatably mounted on a shaft within said stator, a plurality of stator windings, and a circuit for switching stator field currents, said circuit comprising a positive current driver and a negative current driver for each stator winding, said positive current driver operating to permit current flow in one direction through said winding for part of the rotor rotation, said negative current driver operating to permit current flow in the opposite direction for a succeeding part of the rotor rotation, said circuit further comprising sensing means associated with each of said drivers to sense rotor position and produce outputs to cause said associated driver to permit said current flow, said sensing means including means for successively causing current flow through each of said stator windings in turn such that current flows in only one stator winding at a time, said sensing means comprising a plurality of spaced optical interrupters fixedly mounted with respect to the rotor shaft and at substantially equal radial distances therefrom, each of said interrupters having an optical source, an optical receiver and a space therebetween defining an optical path, said sensing means further including a substantially circular plate coaxial with the rotor shaft and adapted to rotate therewith, said plate containing a slot extending circumferentially along the outer edge of said plate of a length corresponding to said part of the rotor rotation that current flows through the windings, said plate being interposed within said optical paths such that a particular one of said optical receivers produces an output only when said slot is within the optical path associated with that receiver, one of said interrupters including a second optical source, optical receiver and space therebetween defining an optical path, and said plate contains a plurality of spaced apertures substantially radially equidistant from the center of said plate such that said second optical receiver produces an output each time one of said apertures traverses said second optical path.

2. The motor according to claim 1 wherein said sensing means produces an output for each 90° of rotor rotation and said current flows in said stator windings for 90° of rotor rotation.

3. The motor according to claim 1 including torque control means for varying the duty cycle of said current flow to modify the torque characteristics of the motor.

4. The motor according to claim 3 wherein said torque control means comprises timing means in association with the rotor for producing an output at predetermined rotor positions, a timer responsive to said output for producing pulses of predetermined duration, and logic means interposed between said sensing means and said drivers for logically combining said sensing means output and said timer output to cause said drivers to permit current flow only for the duration of said sensor output and said timer output.

5. The motor according to claim 4 wherein said sensing means and said timing means produce outputs for each 90° of rotor rotation, said output of said sensing means and said time means occurring coincidentally.

6. The motor according to claim 1 including damping means in association with said stator windings for increasing the amount of energy stored in the winding during the period of time when said associated current driver prevents current flow through said associated stator winding.

7. A system for switching stator filed currents in an electric motor having a plurality of stator windings, a rotor and a source of electric power, said system comprising a plurality of position sensors energized by a first source of electric current, each of said sensors being adapted to produce an output signal at successive rotor positions, and switch means including a plurality of successively conducting switches responsive to said output signals for permitting current flow through each of the stator windings in succession for less than an entire rotor revolution such that current flows in only one stator winding at a time, torque control means for varying the duty cycle of said current flow through the stator windings to modify the torque characteristics of the motor, said torque control means comprising an auxiliary sensor producing output pulses representative of relative rotor position, a timer responsive to said pulses for producing a pulse of predetermined duration, an AND gate interposed between each of said position sensors and said switch means and responsive to said pulse of predetermined duration and said position sensor output pulse to produce an output for permitting current flow through the stator windings only for the duration of said AND gate output, said torque control means including a differentiator, said differentiator pdoucing a first signal at the start of said auxiliary sensor output pulse and a second signal at the end of said auxiliary sensor output pulse, said first signal causing said timer to reset and said second signal causing said timer to commence producing said pulse of predetermined duration.

8. The system according to claim 7 wherein said timer includes adjustment means for varying the duration of said pulse of predetermined duration.

9. The system according to claim 7 wherein said auxiliary sensor comprises an optical source and an optical receiver.

10. The system according to claim 7 wherein said position sensors comprise optical sources and optical sensors.

11. The system according to claim 7 wherein said first source of electric current oscillates to cause said sensors to produce a time varying output for insuring selfstarting of the motor.

12. The system according to claim 7 wherein said switch means includes capacitor means associated with each of said switches, said capacitor means charging while said switches are conducting and discharging when the next successive switch is about to conduct to inhibit current flow through said conducting switch.

* * * * *